United States Patent

Maeda et al.

Patent Number: 5,853,249
Date of Patent: Dec. 29, 1998

[54] ROLLING CONTACT BEARING

[75] Inventors: Kikuo Maeda, Mie-prefecture; Katsunori Ito, Aichi-prefecture, both of Japan

[73] Assignee: NTN Corporation, Osaka, Japan

[21] Appl. No.: 627,943

[22] Filed: Apr. 3, 1996

[30] Foreign Application Priority Data

May 12, 1995 [JP] Japan .................................. 7-138472

[51] Int. Cl.$^6$ .............................. F16F 33/32; F16F 33/62
[52] U.S. Cl. ......................... 384/492; 384/625; 384/907
[58] Field of Search ................................... 384/492, 510, 384/513, 903, 625, 907

[56] References Cited

U.S. PATENT DOCUMENTS

| | | | |
|---|---|---|---|
| 4,047,981 | 9/1977 | Arnold et al. | 148/16 |
| 4,394,234 | 7/1983 | Asahi et al. | 204/164 |
| 4,470,854 | 9/1984 | Nakamura | 148/16.5 |
| 4,873,150 | 10/1989 | Doi et al. | 428/627 |
| 4,904,094 | 2/1990 | Furumura et al. | 384/625 |
| 4,938,614 | 7/1990 | Imamura et al. | 384/903 |
| 5,030,017 | 7/1991 | Murakami et al. | 384/625 |
| 5,084,116 | 1/1992 | Mitamura | 384/492 |
| 5,085,733 | 2/1992 | Mitamura | 384/492 |
| 5,292,200 | 3/1994 | Matsumato et al. | 384/625 |
| 5,338,377 | 8/1994 | Mitamura et al. | 148/318 |
| 5,352,303 | 10/1994 | Murakami et al. | 384/625 |
| 5,415,705 | 5/1995 | Furamura et al. | 384/492 |
| 5,439,300 | 8/1995 | Hirakawa et al. | 384/625 |
| 5,528,799 | 6/1996 | Bach et al. | 19/258 |

*Primary Examiner*—Rodney H. Bonck
*Assistant Examiner*—Matthew A. Kaness
*Attorney, Agent, or Firm*—Koda & Androlia

[57] ABSTRACT

A rolling contact bearing made from intermediate or high carbon steels including a bearing ring composed of an inner ring and an outer ring, rolling elements rotatably interposed between the inner and outer rings and a peripheral snap ring groove provide on the outer periphery of the bearing ring. The rolling contact bearing is characterized in that the groove includes a mill scale portion having a carbonitrided layer beneath the mill scale portion and substantially remaining unremoved after carbonitriding, that the carbonitrided layer contains a precipitated carbonitride content in a range from 10 to 30% by area of the carbonitrided layers and/or that the maximum grain diameter of carbonitrided precipitated in the carbonitrided layer beneath the mill scale portion on the inner surface of the snap ring groove of the bearing is 8 $\mu$m

7 Claims, 5 Drawing Sheets

ROLLING CONTACT BEARING

BACKGROUND OF THE INVENTION

1. Field of the Invention

The present invention relates to a rolling contact bearing carbonitrided and provided with a snap ring groove on the outer periphery of the bearing ring, more particularly to a rolling contact bearing having higher crack fatigue resistance at the snap ring groove.

2. Prior Art

Some rolling contact bearings are provided with a groove for receiving a snap ring on the outer diameter surface of the outer ring thereof to restrict the movement of the bearing in the axial direction. FIG. 5 is an example of a ball bearing with a snap ring in a vertical cross-sectional view. This bearing comprises an outer ring 1, an inner rung 2, a plurality of balls 3 interposed between the bearing ring surfaces 11, 21 of the outer ring 1 and the inner ring 2 respectively. The outer ring 1 is provided with a snap ring groove 14 along the outer diameter of the outer ring 1 at a position closer to the one side of the outer ring 1. The bearing is used with a snap ring 4 fitted in the snap ring groove 14.

This bearing is installed in an apparatus as described below, although the installation condition is not shown. The outer diameter surface 13 of the outer ring 1 is fitted in a bearing housing. With the end face of the housing making contact with the side face of the snap ring 4, the other side surface of the outer ring 1 is pushed by using a pushing member to securely set the bearing in the axial direction. During the operation of the bearing, the bearing undergoes repetitive stress due to the continuous rolling of the balls, while the inner surface of the snap ring groove in the outer ring 1 is restrained by the snap ring 4.

After a lathe turning process, the outer ring and the inner ring of the rolling contact bearing are usually heattreated for hardening in order to have an adjusted necessary surface hardness on the bearing ring surfaces. This process is followed by grinding. Although the mill scale portions generated on the surfaces after heat treatment are removed by grinding, the mill scale portion on the inner surface of the snap ring groove is not removed, since a grindstone cannot reach the inner surface.

Carbonitriding has recently been adopted to enhance the wear resistance of the bearing ring surfaces of rolling contact bearings and to improve the rolling contact fatigue lives of the bearings. Carbon and nitrogen are diffused by carbonitriding from the bearing ring surface to generate concentration gradients beneath the surface. Since the conditions for carbonitriding are determined so that the surface layer has proper concentrations of carbon and nitrogen when the surface layer is ground after carbonitriding, the mill scale portion having not been ground has excessive concentrations of C and N, and the grains of carbide and carbonitride precipitated in the mill scale portion become coarse.

When a bearing having the mill scale portion remaining on the inner surface of the snap ring groove is used, there is fear of generating crevices on the inner surface of the groove, resulting in crack propagation on the outer diameter of the bearing ring provided with the groove. For this reason, the fatigue of the snap ring groove is sometimes used as a factor for determining the life of the whole bearing. Although it is predicted that carbide and carbonitride precipitated because of excessive concentrations of carbon and nitride on the mill scale portion will cause stress concentration, countermeasures for the stress concentration have not been taken sufficiently.

SUMMARY OF THE INVENTION

Accordingly, the object of the present invention is to provide a rolling contact bearing having higher crack fatigue resistance at the snap ring groove to be used without being ground after carbonitriding.

The present invention offers two solutions for improving the above-mentioned crack fatigue strength of the snap ring groove. In accordance with a first solution, the carbonitrided layer beneath the mill scale portion of the snap ring groove contains a carbonitride content of 10 to 30% in terms of area ratio. In accordance with a second solution, the maximum grain diameter of the carbonitride is 8 $\mu$m or less. In other words, the area ratio and grain diameter of the carbonitride are limited. Although the first and second solutions are independently useful to improve the fatigue strength in principle, both solutions can be used together intentionally or unintentionally.

DETAILED DESCRIPTION OF THE INVENTION

Figure 1:
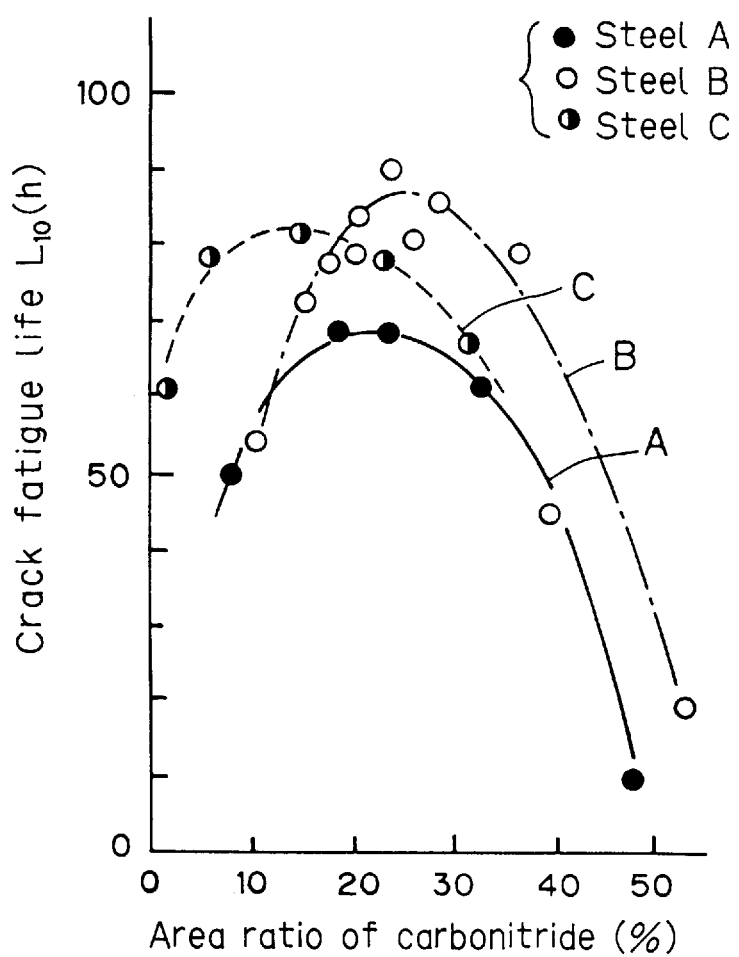
FIG. 1 is a graph showing the effect of the area ratio of carbonitride precipitated in a mill scale portion on crack fatigue life.

The rolling contact bearing of the present invention comprises a bearing ring composed of an inner ring and an outer ring, rolling elements rotatably interposed between the inner and outer rings, and a peripheral snap ring groove provided on the outer diameter of the bearing ring, the rolling contact bearing being characterized in that the groove comprises a mill scale portion having a carbonitrided layer beneath the mill scale portion and remaining unremoved after carbonitriding, that the carbonitrided layer contains a precipitated carbonitride content of 10 to 30% in terms of area ratio, and that the area ratio is the maximum among those of carbonitride contents observed in microscope's visual field within a depth of about 50 $\mu$m beneath the mill scale portion.

Furthermore, the rolling contact bearing of the present invention is characterized in that the maximum grain diameter of carbonitride precipitated in the carbonitrided layer beneath the mill scale portion on the inner surface of the snap ring groove of the bearing ring is 8 $\mu$m or less.

The types of steels used for the present invention are intermediate or high-carbon steels containing 0.4% or more of C. For example, a chrome steel for bearings (JIS SUJ2 steel or the like), a chrome steel for bearings with a higher content of manganese (JIS SUJ3 steel or the like) and a steel containing a higher content of manganese instead of chrome can be used widely. The outer and inner rings are made of these types of steels, and a snap ring groove is formed by machining in the outer ring. The outer and inner rings are then carbonitrided in order to have carbonitrided layers on their surface layers. Finally, the peripheral surfaces including bearing ring surfaces of the rings are finished by grinding.

The carbonitrided layer on the inner surface of the snap ring groove of the bearing ring is not ground off so that the mill grain portion on the carbonitrided layer remains as it is. Therefore, carbonitrides are precipitated in the carbonitrided layer in the range of 20 to 50 $\mu$m beneath the mill scale portion. The carbonitrides near the mill scale portion are closely related to the starting points of crevices or propagation of crevices. The carbonitrided layer containing a carbonitride content of 10 to 30% in terms of area ratio is the best in improving rolling contact fatigue life, crack fatigue life and static fracture strength. When the area ratio is less than 10%, the effect of carbonitriding for improving the rolling contact fatigue life of the bearing ring surface layer appears less. When the area ratio is more than 30%, the surface layer of the mill scale portion is apt to be made brittle by a large amount of carbonitrides, resulting in shorter crack fatigue life and lower static fracture strength at the snap ring groove.

Since the carbonitrides are present in the carbonitrided layer in the depth of 20 to 50 $\mu$m beneath the mill scale portion, the area ratio of the carbonitride referred to in the present specification is the maximum among the area ratios of the carbonitride observed and measured in microscope's visual field in the carbonitrided layer within a depth of about 50 $\mu$m beneath the mill scale portion.

Regarding the size of the carbonitride in the carbonitrided layer beneath the mill scale portion, the maximum grain diameter of the carbonitride should be 8 $\mu$m or less. When the maximum grain diameter is more than 8 $\mu$m, such large carbonitride grains become the sources of stress concentration when the mill scale portion undergoes repetitive stress, and also become the sources of crevice generation, thereby shortening the crack fatigue life at the snap ring groove.

The maximum grain diameter of the carbonitride is defined as the maximum of the grain diameters measured by observing the etched and ground surfaces of samples with a microscope; the grain diameter is the diameter of a carbonitride grain when the carbonitride grain has the shape of a disc in cross section, or the major axis of an elliptical carbonitride grain when the carbonitride grain has the shape of an ellipse, or the length across a carbonitride grain when the carbonitride grain has an indefinite shape.

In the carbonitriding treatment for prolonging the rolling contact fatigue life of the bearing, a carbonitrided layer is formed on the bearing ring surface, and wear resistance and heat resistance against the rolling elements and toughness are offered to the bearing ring surface, thereby improving the rolling contact fatigue life of the bearing, in particular, the rolling contact fatigue life under lubrication using lubricating oil including foreign matter. However, since the mill scale portion remains unremoved beneath the mill scale portion of the snap ring groove in the case of the present invention, the area ratio and the maximum grain diameter of the carbonitride in the mill scale portion after carbonitriding must be controlled so as to conform to the above-mentioned ranges.

The method for controlling the carbonitrides beneath the mill scale portion is described below by utilizing a conventional gas carbonitriding method as an example. When a high-carbon chrome steel for bearings is treated, carbonitriding is performed for about 150 minutes in the temperature range of 850° to 880° C. in an atmosphere wherein ammonia is added to carbonitriding gas basically containing NX or RX gas so that the ammonia content is in the range of 3 to 10% in volume, and carbon potential is adjusted in the range of 0.7 to 1.0%, followed by oil quenching to harden the steel. In this method, carbonitride grains are prevented from becoming larger by controlling the amount of ammonia added in addition to the carbon potential. After carbonitriding, low-temperature tempering is usually performed at 200° C. or less.

By carbonitriding both the inner and outer rings as described above, all the surfaces (including the inner surface of the snap ring groove 14) of the rolling contact bearing in accordance with the present invention are produced with carbonitrided layers. Although the mill scale portions on the surfaces of the inner and outer rings, except the mill scale portion on the inner surface of the snap ring groove 14, are removed by grinding during normal manufacturing, only the mill scale portion on the inner surface of the snap ring groove 14 is not ground away and remains unremoved as carbonitrided mill scale, and the bearing thus having the mill scale is used. Since the area ratio or the maximum grain diameter of the carbonitride in the carbonitrided layer beneath the mill scale portion is controlled, the generation of cracks due to fatigue and excessive stress at the snap ring groove 14 can be delayed, whereby the crack fatigue life can be prolonged.

In addition to the above-mentioned types of steels, a steel containing 0.8 to 1.2% of C, 0.4 to 1.0% of Si, 0.8 to 1.5% of Mn and 0.2 to 1.2% of Cr is desirable as a bearing ring material. This type of steel has already been disclosed in Japanese Patent Application No. 5-353236 by the applicant of the present invention. According to the specification of the application, this steel has a particularly higher content of Mn, namely 0.8 to 1.5% of Mn. Other high-carbon steels for bearings have higher hardening capability to increase the amount of retained austenite after hardening and tempering. In addition, the steel has a higher content of Si, namely 0.4 to 1.0% of Si, to offer high resistance against softening during tempering. By carbonitriding this steel, the amount of retained austenite is increased on the surface layer of the steel because of the high content of Mn and the abundance of N. The surface hardness and the resistance against softening during tempering are also increased by precipitated carbonitrides, whereby the wear resistance and heat resistance of the bearing ring surfaces can be enhanced and the rolling contact fatigue life can be prolonged.

Since the amount of retained austenite can be increased in the carbonitrided and hardened layer beneath the mill scale portion of the bearing ring made of the steel having the above-mentioned composition, the mill scale portion can have higher toughness and can generate higher residual compression stress than the mill scale portion made of the conventional JIS SUJ2 steel, whereby the crack fatigue life of the bearing ring can be prolonged even when the same amount of carbonitride is contained in terms of area ratio.

The advantages of the present invention are described below on the basis of the results, table and graphs obtained from a variety of tests.

First, to obtain controlled data, ring samples, both the inner and outer peripheral surfaces of which were ground without leaving mill scale after carbonitriding, were tested to examine their crack fatigue lives and static fracture strengths as described below.

<Crack fatigue life test for samples with no mill scale>

Three types of steels (steel A, steel B and steel C) are selected for samples and formed into rings measuring 60 mm in outer diameter, 45 mm in inner diameter and 15 mm in width. Two types of heat treatments, namely carbonitriding described later and ordinary dip quenching, were performed. After tempering, both the inner and outer peripheral surfaces were ground to remove mill scale.

These ring samples were rotated between rolls at a load of 9.8 kN and a repetition frequency of 8000 cpm. Crack fatigue life values were measured under repetitive compression/tension stress loads to the inner peripheral surface in order to obtain 10% life values.

<Static fracture strength test for samples with no mill scale>

In addition, by using ring samples made in the same way as those described above, a compression crush test, wherein pressure was applied to the outer diameter surfaces of each ring sample, was conducted to obtain static fracture strength values.

The heat treatment was conducted in the following conditions. In the case of carbonitriding, the samples were heated for 150 minutes at 850° C. in an atmosphere wherein ammonia was added to carbonitriding gas basically containing NX or RX gas so that the ammonia content was 10% in volume, and carbon potential is adjusted to 1.0%, followed by oil quenching. Tempering was conducted for two hours at 180° C.

In the case of dip quenching, the samples were heated for 30 minutes at an austenitizing temperature of 850° C. and quenched in oil. Tempering was conducted for two hours at 180° C. just as in the case of carbonitriding.

TABLE 1

| Steel | Chemical composition | | | | Carboni- triding treat- ment | Rolling contact fatigue life $L_{10}$ (h) | Crack fatigue life $L_{10}$ (h) | Static fracture strength (kN) |
|---|---|---|---|---|---|---|---|---|
| | C | Si | Mn | Cr | | | | |
| A | 0.97 | 0.17 | 0.29 | 1.32 | Not treated | 20 | 10.2 | 39.8 |
| | | | | | Treated | 43 | 77.6 | 36.3 |
| B | 0.96 | 0.43 | 1.14 | 1.15 | Not treated | 45 | 17.9 | 43.8 |
| | | | | | Treated | 146 | 92.0 | 33.3 |
| C | 0.65 | 0.80 | 1.10 | 0.20 | Not treated | 16 | 9.8 | — |
| | | | | | Treated | 117 | 85.2 | 37.5 |

Table 1 summarizes the compositions and test results of the above-mentioned three types of steels. Steel A corresponds to JIS SUJ2, steel B corresponds to JIS SUJ3 containing a high content of Mn, and steel C corresponds to an intermediate-carbon, high-Mn steel with Cr adjusted to a low level and Si to a high level. The expression "Not carbonitrided" in the table refers to the dip quenching and tempering treatment.

<Rolling contact fatigue life test for samples with no mill scale>

This table also shows the rolling contact fatigue life (10% life) values of bearings made of the above-mentioned three types of steels, obtained by conducting a rolling contact fatigue life test. The bearings used for the rolling contact fatigue life test correspond to a type of taper roller bearing (Model No. 3206). The bearings were tested at a load of 17.64 kN and a revolution speed of 2000 rpm in a lubrication condition wherein hard foreign matter having a hardness of Hv750 (atomized steel powder having grain diameters in the range of 104 to 177 $\mu$m) was mixed in lubricating oil at a rate of 40 mg/40ml.

According to Table 1, samples which undergo carbonitriding are superior to those which undergo dip quenching in both crack fatigue life and rolling contact fatigue life tests. The crack fatigue life is improved by carbonitriding, since the increased amount of retained austenite on the surface layer enhances the toughness.

In contrast, the static fracture strength is apt to be decreased slightly by carbonitriding, because the heating time for carbonitriding is longer than that for dip quenching and the carbonitrided products have coarse micro composition.

In addition, the effects of the types of steels on the crack fatigue life and rolling contact fatigue life were also observed to find that steel B behaved to obtain the best result.

<Crack fatigue life test for samples with mill scale>

Next, regarding the present invention, ring samples having mill scale remaining on the inner peripheral surface after carbonitriding were tested to examine their crack fatigue lives and static fracture strengths, and the results of the test are described below.

The test was conducted by using ring samples made of the three types of steels (steel A, steel B and steel C) shown in Table 1 and having the same dimensions as those of the samples used for the above-mentioned crack fatigue life test (60 mm in outer diameter, 45 mm in inner diameter and 15 mm in width). Carbonitriding was performed for 150 minutes at 850° C. in an atmosphere wherein the content of ammonia to be added was changed to a value in the range of 3.0 to 20.0% in volume, and carbon potential was also changed to a value in the range of 0.6 to 1.5%, so as to change the distribution of carbonitride in the carbonitrided layer beneath the mill scale. Tempering was conducted for 2 hours at 180° C. Only the inner peripheral surface of each ring sample was not ground away so as to leave mill scale, but the outer peripheral surface was ground. These ring samples were then subjected to a crack fatigue life test and a static fracture strength test described later.

FIG. 1 shows the effect of the area ratio of precipitated carbonitride at mill scale on crack fatigue life. The crack fatigue life is apt to increase in a certain range of the area ratio of carbonitride. It is recognized that the crack fatigue life lowers significantly when the area ratio of carbonitride is more than 40%, and also lowers when the area ratio is too small.

The test results are examined further with respect to the type of steel. In the case of steels A and B categorized as high-carbon steels, the area ratio of carbonitride should be in the range of 10 to 40% to enhance the crack fatigue life. However, when static fracture strength described later is considered, it is most suitable that the area ratio of carbonitride is in the range of 10 to 30%. On the other hand, in the case of steel C categorized as an intermediate-carbon steel, the crack fatigue life is high in a wide area ratio range of about 10 to 40%.

When the peak values of the crack fatigue life values are evaluated referring to FIG. 1, the peak values of the crack fatigue life values of steels A, B and C are respectively close to the crack fatigue life values of the samples listed in Table 1, which were carbonitrided, both the inner and outer peripheral surfaces of which were ground. The most suitable area ratio of carbonitride is in the range of 20 to 30% in the case of steels A and B, and is in the range of 5 to 25% in the case of steel C. It is thus recognized that by adjusting the area ratio of carbonitride in order to conform the ranges above, the ring samples with mill scale can have crack fatigue life values nearly equal to those of the ring samples having been ground on all surfaces thereof, even when mill scale remains unremoved.

Furthermore, it is also recognized that steel B is most suitable in crack fatigue life referring to FIG. 1.

<Static fracture strength test for samples with mill scale>

Figure 2:
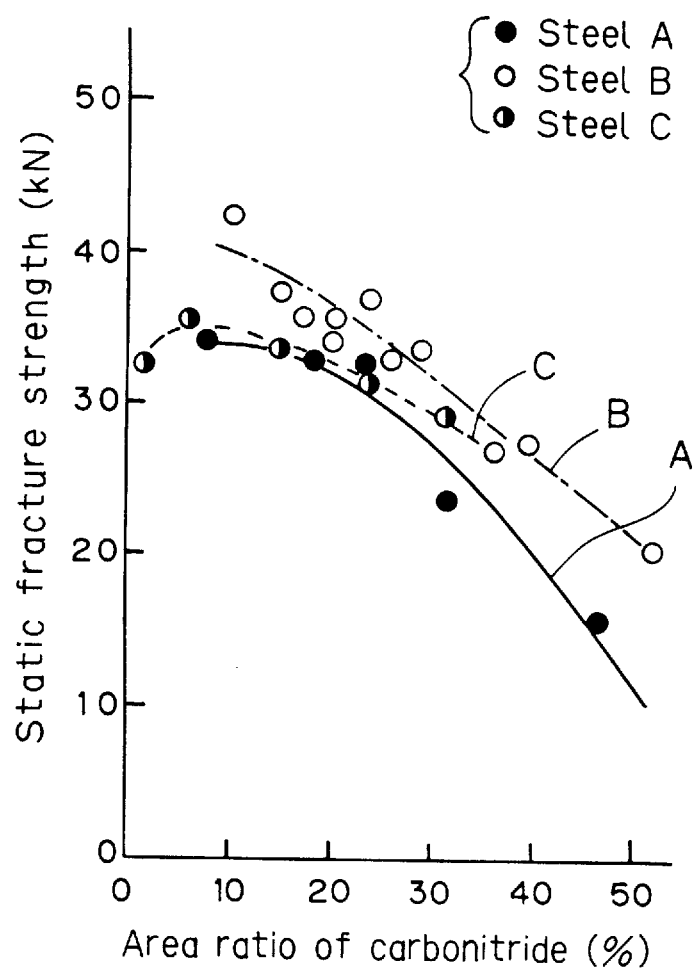
FIG. 2 is a graph showing the effect of the area ratio of carbonitride precipitated in a mill scale portion on static fracture strength.

FIG. 2 shows the effect of the area ratio of carbonitride precipitated in mill scale on static fracture strength. The static fracture strength is measured in consideration of the danger of causing crevices starting from the mill scale portion on the inner peripheral surface and quickly resulting in crush when an excessive load is applied to the outer ring during bearing operation. In this case, however, the difference depending on the type of steel is small, and better results are obtained as the area ratio of precipitated carbonitride is smaller. According to FIG. 2, it is recognized that the static fracture strength is lowered when the area ratio of precipitated carbonitride is more than 30%.

<Test for examining the effect of carbonitride on the static fracture fatigue life and static fracture strength of samples with mill scale>

Figure 3:
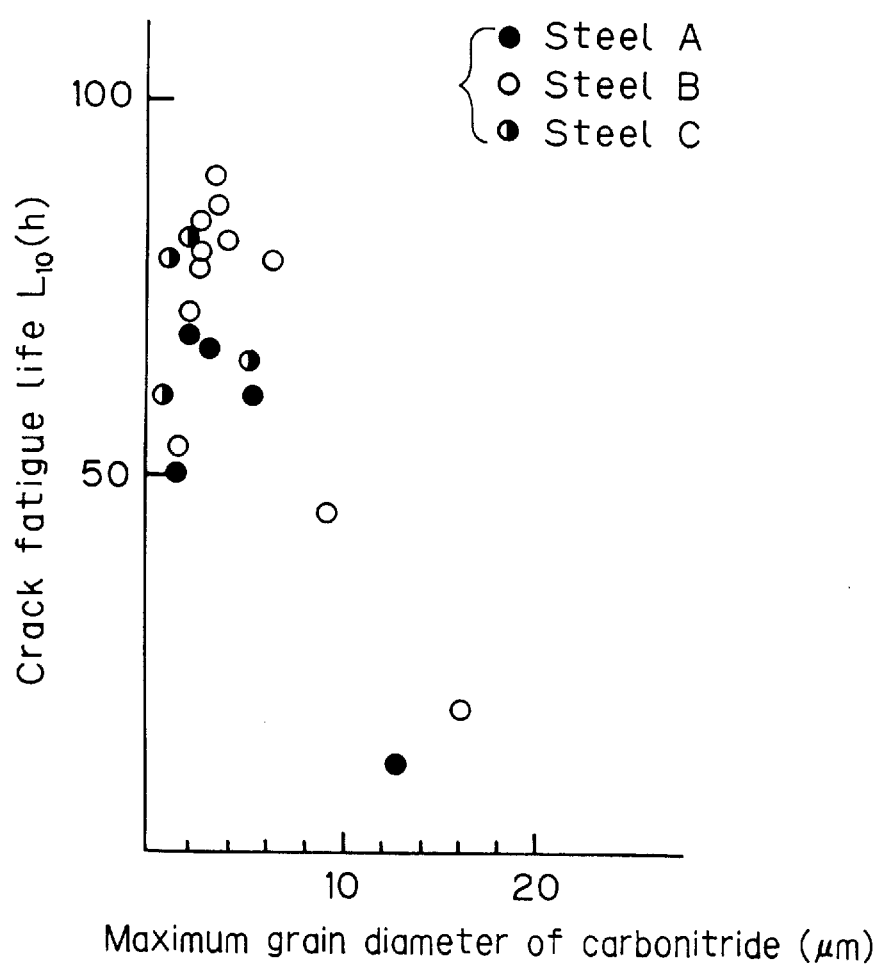
FIG. 3 is a graph showing the effect of the maximum grain diameter of carbonitride precipitated in a mill scale portion on crack fatigue life.
Figure 4:
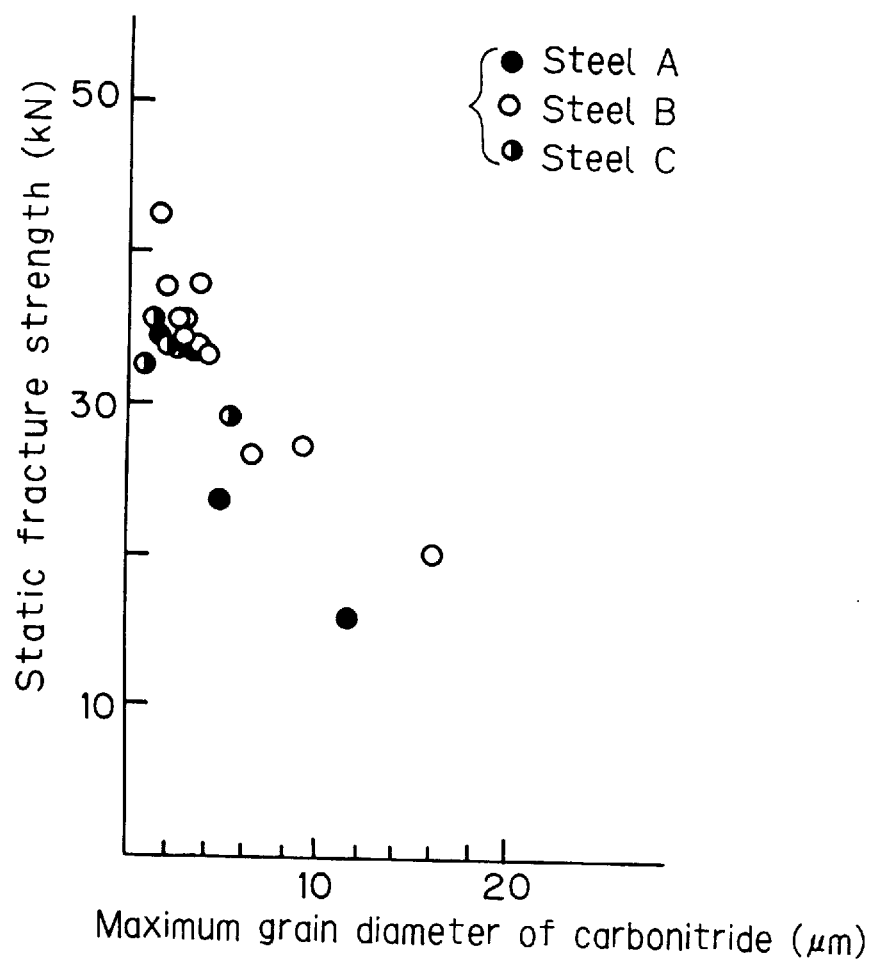
FIG. 4 is a graph showing the effect of the maximum grain diameter of carbonitride precipitated in a mill scale portion on static fracture strength.
Figure 5:
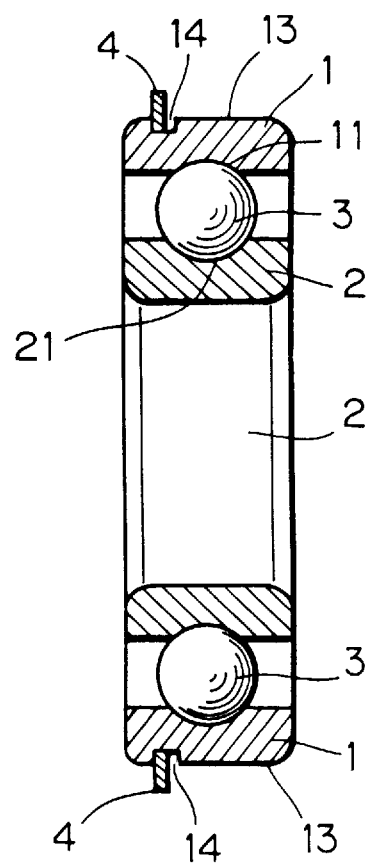
FIG. 5 is a vertical cross-sectional view of a ball bearing with a snap ring.

FIGS. 3 and 4 show the effects of the maximum grain diameter of precipitated carbonitride in mill scale on crack fatigue life and static fracture strength respectively. It is found that both the crack fatigue life and static fracture strength are lowered when coarse carbonitride grains are present. The crack fatigue life and static fracture strength are prevented from being lowered by setting the maximum grain diameter to 8 $\mu$m or less. According to FIG. 3, the maximum grain diameter of the carbonitride capable of attaining the maximum crack fatigue life is present for each type of steel, and the grain maximum diameter is in the range of about 2 to 4 $\mu$m.

As can be understood on the basis of the above-mentioned descriptions, since the rolling contact-bearing of the present invention is controlled so that the carbonitrided layer beneath the mill scale portion on the inner surface of the snap ring groove of the bearing ring contains a precipitated carbonitride content of 10 to 30% in terms of area ratio or so that the maximum grain diameter of the carbonitride is 8 $\mu$m or less, the crack fatigue life at the mill scale portion can be improved. Consequently, the crack fatigue life at the mill scale can be enhanced, whereby the rolling contact fatigue life of the bearing can be improved by carbonitriding, and a superior effect of prolonging the life of the bearing can be attained.

Since no special carbonitriding treatment is necessary for the present invention, the present invention can be carried out easily without grinding the inner surface of the snap ring groove and without raising the cost of production.

We claim:

1. A rolling contact bearing comprising:
   a bearing ring composed of an inner ring and an outer ring;
   rolling elements rotatably interposed between the inner and outer rings; and
   a peripheral snap ring groove provided on the outer periphery of the outer ring,
   said rolling contact bearing being characterized in that said groove comprises a mill scale portion substantially remaining unremoved and a carbonitrided layer beneath the mill scale portion, that said carbonitrided layer contains a precipitated carbonitride of an area ratio in a range of 10 to 30%, and that said area ratio is a maximum among area ratios of carbonitride determined in a plurality of microscopically visual fields observed in the layer within a depth of about 50 $\mu$m beneath the mill scale portion.

2. The rolling contact bearing according to claim 1, wherein said bearing ring and rolling element are made from intermediate or hard carbon steels containing greater than 0.4% carbon.

3. A rolling contact bearing comprising:
   a bearing ring composed of an inner ring and an outer ring;
   rolling elements rotatably interposed between the inner and outer rings; and
   a peripheral snap ring groove provided on the outer periphery of the outer ring,
   said rolling contact bearing being characterized in that said peripheral snap ring groove comprises a mill scale portion substantially remaining unremoved and a carbonitrided layer beneath the mill scale portion, that the maximum grain diameter of carbonitride precipitated in said carbonitrided layer beneath the mill scale portion on the surface of the peripheral snap ring groove of the outer ring is 8 $\mu$m or less.

4. The rolling contact bearing according to claim 3, wherein said bearing ring and rolling elements are made from intermediate or high carbon steel containing greater than 0.4% carbon.

5. A rolling contact bearing comprising:
   a bearing ring composed of an inner ring and an outer ring;
   rolling elements rotatably interposed between the inner and outer rings; and
   a peripheral snap ring groove provided on the outer periphery of the outer ring,
   said rolling contact bearing being characterized in that said peripheral snap ring groove comprises a mill scale portion substantially remaining unremoved and a carbonitrided layer beneath the mill scale portion, that the maximum grain diameter of carbonitride precipitated in said carbonitrided layer beneath the mill scale portion on the surface of the peripheral snap ring groove of the outer ring is 8 $\mu$m or less, that said carbonitrided layer contains a precipitated carbonitride of an area ratio in a range of 10 to 30%, and that said area ratio is a maximum among area ratios of carbonitride determined in a plurality of microscopically visual fields observed in the layer within a depth of about 50 $\mu$m beneath the mill scale portion.

6. The rolling contact bearing according to claim 5, wherein said bearing ring and rolling elements are made from intermediate or high carbon steel containing greater than 0.4% carbon.

7. A rolling contact bearing according to claim 1, 3 or 5, wherein the bearing ring is made of a steel containing 0.8 to 1.2% of C, 0.4 to 1.0% of Si, 0.8 to 1.5% of Mn and 0.2 to 1.2% of Cr.

* * * * *